United States Patent
Kolman et al.

(10) Patent No.: US 10,361,593 B2
(45) Date of Patent: Jul. 23, 2019

(54) DUAL FREQUENCY HF-UHF IDENTIFICATION DEVICE

(71) Applicant: EM Microelectronic-Marin S.A., Marin (CH)

(72) Inventors: Jiri Kolman, Prague (CZ); Goran Stojanovic, Neuchatel (CH); Catalin Lazar, Hauterive (CH); Frederic Sacksteder, Basel (CH)

(73) Assignee: EM Microelectronic-Marin SA, Marin (CH)

( * ) Notice: Subject to any disclaimer, the term of this patent is extended or adjusted under 35 U.S.C. 154(b) by 445 days.

(21) Appl. No.: 15/053,042

(22) Filed: Feb. 25, 2016

(65) Prior Publication Data

US 2016/0268850 A1    Sep. 15, 2016

(30) Foreign Application Priority Data

Mar. 10, 2015   (EP) ..................................... 15158483

(51) Int. Cl.
  *H05K 7/14*  (2006.01)
  *H02J 50/20*  (2016.01)
  *G06K 19/077*  (2006.01)

(52) U.S. Cl.
  CPC ........ *H02J 50/20* (2016.02); *G06K 19/07749* (2013.01); *G06K 19/07786* (2013.01)

(58) Field of Classification Search
  CPC ................... H01Q 1/2225; H01Q 1/38; H01L 2224/48091; H01L 2224/45144
  See application file for complete search history.

(56) References Cited

U.S. PATENT DOCUMENTS

| | | | |
|---|---|---|---|
| 2008/0238619 A1* | 10/2008 | Rofougaran | H04B 5/00 340/10.1 |
| 2009/0117872 A1 | 5/2009 | Jorgenson et al. | |
| 2010/0148926 A1* | 6/2010 | Kang | G06K 19/07749 340/10.1 |

(Continued)

FOREIGN PATENT DOCUMENTS

EP    2 679 183 A1    1/2014

OTHER PUBLICATIONS

European Search report dated Sep. 8, 2015 in European Application 15158483, filed on Mar. 10, 2015 ( with written opinion).

*Primary Examiner* — Sibin Chen
(74) *Attorney, Agent, or Firm* — Oblon, McClelland, Maier & Neustadt, L.L.P.

(57) ABSTRACT

The Dual frequency HF-UHF identification device comprises a RFID integrated circuit with a power supply having a HF part, formed by a HF rectifier connected to a HF antenna, and a UHF part formed by a UHF rectifier connected to a UHF antenna. The RFID integrated circuit comprises a storage capacitor common to the HF and UHF parts of the power supply. The HF rectifier output and the UHF rectifier output are both continuously connected to the supply terminal of the common storage capacitor. Further, the supply terminal of the common storage capacitor is connected, on the one hand, to the output of the HF rectifier through a diode arranged so as to block a current from said supply terminal to the HF rectifier output and, on the other hand, directly to the output of the UHF rectifier formed by a charge pump.

8 Claims, 2 Drawing Sheets

(56) References Cited

U.S. PATENT DOCUMENTS

| | | | |
|---|---|---|---|
| 2010/0148965 A1* | 6/2010 | Alexis | G06K 19/0723 340/572.1 |
| 2011/0285511 A1 | 11/2011 | Maguire et al. | |
| 2013/0141151 A1* | 6/2013 | Ochoa | H03H 19/004 327/284 |
| 2013/0154725 A1* | 6/2013 | Huang | H03H 15/023 327/552 |
| 2013/0345695 A1 | 12/2013 | Mcpherson | |
| 2014/0346236 A1* | 11/2014 | Kargl | G06K 19/0708 235/492 |
| 2015/0141979 A1 | 5/2015 | Mcpherson | |

* cited by examiner

DUAL FREQUENCY HF-UHF IDENTIFICATION DEVICE

This application claims priority from European Patent Application No. 15158483.6 filed Mar. 10, 2015, the entire disclosure of which is hereby incorporated herein by reference.

FIELD OF THE INVENTION

The present invention concerns dual frequency HF-UHF identification devices and more particularly such a device comprising a power supply circuit arranged for extracting power from at least a captured electromagnetic field. In a first embodiment, the identification device can be a passive device extracting all needed energy from the electromagnetic field provided by at least an external device (reader/writer or any other RF communicating device). In a second embodiment, this identification device can be battery assisted, i.e., a part of the needed energy for the functioning of at least a part of the device is stored in a battery.

In particular, the device of the invention forms a contactless electronic tag or a contactless smart card.

BACKGROUND OF THE INVENTION

Several dual frequency RFID integrated circuits have been proposed. In particular for the passive devices, the power supply has to be defined and a corresponding integrated circuit has to be arranged accordingly. The power supply generally comprises at least a power generator. In case of two power generators respectively associated to the induced voltage in the resonance circuit of the HF antenna-coil and to the induced voltage in the UHF antenna, a power management is generally provided and the integrated circuit is designed for implementing such a power management.

A dual frequency HF-UHF identification device of the prior art is shown in the FIG. 1, which is a simplified design of the dual frequency tag described in the patent application US 2005/0186904. This dual frequency HF-UHF identification device 2 comprises a HF part 4 and a UHF part 6. The HF part 4 is formed by an HF antenna-coil 10, a resonance capacitor 8, a HF rectifier 12 and an analog HF front end 14 (AFE_HF). The UHF part 6 is formed by a UHF antenna 16, a UHF rectifier 18 and an analog UHF front end 20 (AFE_UHF). The device 2 also comprises a logic unit 22 and a non-volatile memory 24 (NVM), the logic unit 22 been connected either to the analog HF front end 14 or to the analog UHF front end 20 through multiplexers (not shown on FIG. 1) arranged in a first part of the logic unit. The HF rectifier is a diodes rectifier which rectifies the induced voltage in the resonance circuit formed by the antenna-coil 10 and the resonance capacitor 8. On its two input terminals V1$a$ and V1$b$, the HF rectifier alternatively receives positive and negative induced voltages. This HF rectifier generates at its output a first supply voltage $V_{HF}$. In a variant, such a HF rectifier can be associated to a voltage amplifying circuit for generating the first supply voltage. The UHF rectifier is formed by a charge pump linked to the two wires of the UHF antenna 16. This UHF rectifier receives at its two input terminals V2$a$ and V2$b$ positive and negative induced voltages and is arranged to provide at its output a second supply voltage $V_{UHF}$.

Further, the device 2 comprises a combined power and mode management formed by a mode detection unit 26 and a switch 30. The mode detection unit senses an induced voltage in the HF resonance circuit (for example the voltage V1$a$) and delivers a mode signal DET the value of which indicates if the HF antenna-coil detects the receipt of an HF electromagnetic field in the resonance range of the HF resonance circuit (e.g. 13.56 MHz). The mode signal controls the control gate of the switch 30 through a first control line 31 and the logic unit 22 through a second control line 32. The switch is arranged between the UHF rectifier output and the supply line 28 providing a supply voltage $V_{sup}$ to the electronic circuit. The operation of the power management is as follows:

a) When unit 26 detects at least a given voltage in the HF part of the power generator (in particular an induced voltage in the HF resonance circuit or alternatively at the output of the HF rectifier), the output of unit 26 is set to a first logical value (e.g. '1') and the mode signal DET indicates that there is an incoming HF electromagnetic field. The switch 30 is arranged so that, when the mode signal is set to the first logical value, this switch opens ('OFF' position) and thus the UHF power generator is not active, whether the voltage $V_{UHF}$ is zero or not. The integrated circuit of device 2 is thus only powered by the HF part so long the detected voltage by the mode detection unit is at least equal to said given voltage. Further, the logic unit receives this mode signal and activates the HF protocol and associated circuit portions, in particular the multiplexers are put in a first state wherein only HF demodulated signals are transmitted to the logic unit (no UHF signal is transmitted).

b) When unit 26 does not detect at least said given voltage in the HF part of the power generator, the output of unit 26 is set to a second logical value (e.g. '0') and the mode signal DET indicates that there is no incoming HF electromagnetic field. The switch 30 is turned on and is thus closed, allowing the UHF part of the power generator to power the integrated circuit if an induced voltage is generated in this UHF part. Further, the logic unit receives this mode signal and activates the UHF protocol and associated circuit portions, in particular the multiplexers are put in a second state wherein only UHF demodulated signals are transmitted to the logic unit (no HF signal is transmitted).

The device 2 is thus arranged so as to give priority to an incoming HF field. An opposite choice can be made by giving priority to the UHF field in a similar manner as described here above. However, the alternative giving priority to the HF field is preferred, as taught by the US patent application in question, in order to give priority to the writing of data in the NVM memory. It is to be noted that this document teaches that the voltage generated by the UHF part of the power generator is too low for erasing and programming an EEPROM or a FLASH memory. Thus, even if the switch is arranged between the HF rectifier output and the supply terminal $V_{sup}$ of the storage capacitor, the teaching is to select the HF mode as soon as a given induced voltage is detected in the HF resonance circuit.

The device 2 has many drawbacks. First, there is a mode selection allowing only a HF or a UHF communication, but not both simultaneously. Then, if a given activity level is detected in the HF range, generally a low one for sensitivity reasons, the UHF communication is deactivated so that no communication in the UHF range can occur. If an UHF communication is running, the detection of the given voltage in the HF part will stop such a communication. Finally, the power management does not allow a HF field provided to the device 2 to participate to the power supply of this device for a UHF communication, and inversely. This is a big disadvantage of the device 2.

A passive device with multiple energy harvesting and communication channels is described in the patent application US 2009/0117872. This document illustrates one general embodiment at its FIG. 1A with a more detailed electronic design given in FIG. 2A. The passive device includes two antennae which are respectively coupled to two 1-stage half wave diode rectifiers which are arranged in series. The output capacitors of these two rectifiers are thus connected in series and a further common capacitor also stores energy from the two rectifiers in order to provide a DC power to the passive device. This implementation is particular. First, it is to be noted that the first antennae can provide energy to both output capacitors of the two rectifiers when the second antenna can provide energy only to the second output capacitor. Further, it is to be noted that each antenna is coupled to the electronic circuit through an entry capacitor which is connected in series with the antenna. Several problems occur with such an electronic design for a multiple energy harvesting. First, the capacitive coupling is generally used for frequencies largely above the HF frequency normally selected at 13.56 MHz, in particular for the UHF frequency range. However, the kind of rectifier which is taught in the document US 2009/0117872 is much more appropriate to LF or HF signals. Practically, it would not be reasonable to use such a power generator with a HF signal received by the first antenna and a UHF signal received by the second antenna. The coupling capacitor would be very big and with a lot of leakage current due to its size. To have approximately the same impedance at the entries of both rectifiers, the size of the entry capacitor for the HF channel should be 200 times larger than the one for the UHF channel. Thus, the HF entry capacitor would not be easily integrated in an integrated circuit because it would need a too large space. Further, when the frequencies of the two signals respectively received by both antennae are different, destructive interference can occur with the described power generator so that energy will be lost.

Other particular embodiments are described in FIG. 1B to FIG. 1I of the document US 2009/0117872 but the teaching seems to indicate that these are particular cases with special functioning. For examples, with reference to the embodiment of FIG. 1G, it is written that the output currents of both rectifiers have to be the same and, with reference to the embodiment of FIG. 1H, it is written that each of the output voltages of both RF rectifiers is about equal to the input voltage of a power regulator, i.e. the output voltages of both RF rectifiers are about equal. Most of the time, such a situation will not occur with two different signals respectively received by both antennae. Further, one aim of a multiple energy harvesting is to be able to harvest energy from one source or the other or from both with different generated voltages.

SUMMARY OF THE INVENTION

The aim of the present invention is to provide a dual frequency HF-UHF RFID integrated circuit and a dual frequency HF-UHF identification device comprising such an integrated circuit which overcome the drawbacks of the prior art devices previously described, and to provide such an integrated circuit with a simple and efficient power supply arrangement.

For this purpose, the present invention concerns a dual frequency HF-UHF RFID integrated circuit comprising a power supply having a HF part, formed by a HF rectifier intended to be connected to a resonance circuit formed by a HF antenna-coil and a resonance capacitor, and a UHF part comprising a UHF rectifier formed by a charge pump and intended to be connected to a UHF antenna. This RFID integrated circuit further comprises a storage capacitor common to the HF and UHF parts of the power supply, the HF rectifier output and the UHF rectifier output being both continuously connected to the supply terminal of the common storage capacitor. The supply terminal of the common storage capacitor is connected to the output of the HF rectifier through a diode arranged so as to block a current from this supply terminal to the HF rectifier output.

By 'continuously connected' it is comprised that there is no selecting switch or other selecting means which selects the HF rectifier or the UHF rectifier as power generator for the power supply of the device when both HF and UHF rectifiers receive at least useful induced voltages at their respective input terminals. In other terms, there is no deactivating means giving priority to one of the HF and UHF rectifiers and avoiding the other one to supply the electronic device.

A main advantage of the RFID integrated circuit of the invention is that there is no selection between the HF power generator and the UHF power generator for supplying this integrated circuit. This means that, independently of the used communication protocol (HF or UHF), both incoming HF and UHF fields which are captured by the HF resonance circuit and the UHF antenna can participate to the power supply. It is to be noted that the strengths of the HF and UHF fields received by the respective antennas can vary in function of time. The power supply of the invention allows that, during a first time interval, the power supply is mainly provided through the HF power generator and, during a second time interval following the first one, mainly through the UHF power generator. In another situation, both HF and UHF power generators provide enough voltage to charge the storage capacitor and to supply the integrated circuit. In particular, a communication through the UHF channel can occur when the RFID integrated circuit is mainly powered by the HF incoming magnetic field captured by the HF resonance circuit of the identification device. When a communication through the HF channel occurs, the HF power generator is usually providing more power than the UHF power generator. However, depending on the positions of a HF interrogator and a UHF interrogator relative to the identification device, there are situations where the UHF power generator can aid for the power supply of the RFID integrated circuit during a HF communication. In all situations, the power supply is efficient by using all captured electromagnetic fields. Such an efficient power supply is nevertheless obtained by a simple electronic circuit so that it does not increase the cost or the power loss in the power supply circuit.

The diode arranged between the output of the HF rectifier and the supply terminal of the common storage capacitor, so as to block a current from the supply terminal to the HF rectifier output, avoids that a part of a supply current provided by the UHF power generator can be dissipated in the HF part of the power supply. This protection is provided in order to minimize a power loss when the RFID integrated circuit is mainly powered through the UHF power generator, in particular in the absence of a HF magnetic field. Such a diode is important because the power generated by the UHF part of the power supply is generally relatively low, in particular when the UHF interrogator is far away from the RFID identification device.

According to a preferred variant, a resistor for limiting a current provided by the HF rectifier is arranged between the output of this HF rectifier and the supply terminal of the common storage capacitor. Further, the supply terminal of the storage capacitor can further be connected to a shunt voltage regulator regulating, so as to regulate a supply voltage $V_{SUP}$ provided on the supply line of the power supply and also to limit the voltage level at the output of the UHF power generator. The current limiting resistor is also forming with the common storage capacitor a LF filter. Such LF filter would help to further filter any supply noise that might occur on the $V_{HF}$ node at the output of the HF rectifier.

According to a particular variant, the supply terminal of the common storage capacitor is directly connected to the output of the UHF rectifier. This feature is also advantageous for the reasons given previously. By a direct connection, it is comprised that there is no electronic element which significantly consumes power, preferably no electronic element other than the electrical path between the supply terminal of the storage capacitor and the output of the UHF rectifier.

BRIEF DESCRIPTION OF THE DRAWINGS

The present invention will be described subsequently in more detail with reference to the attached drawings, given by way of examples, but in no way limited thereto, in which.

DETAILED DESCRIPTION OF THE INVENTION

Figure 1:
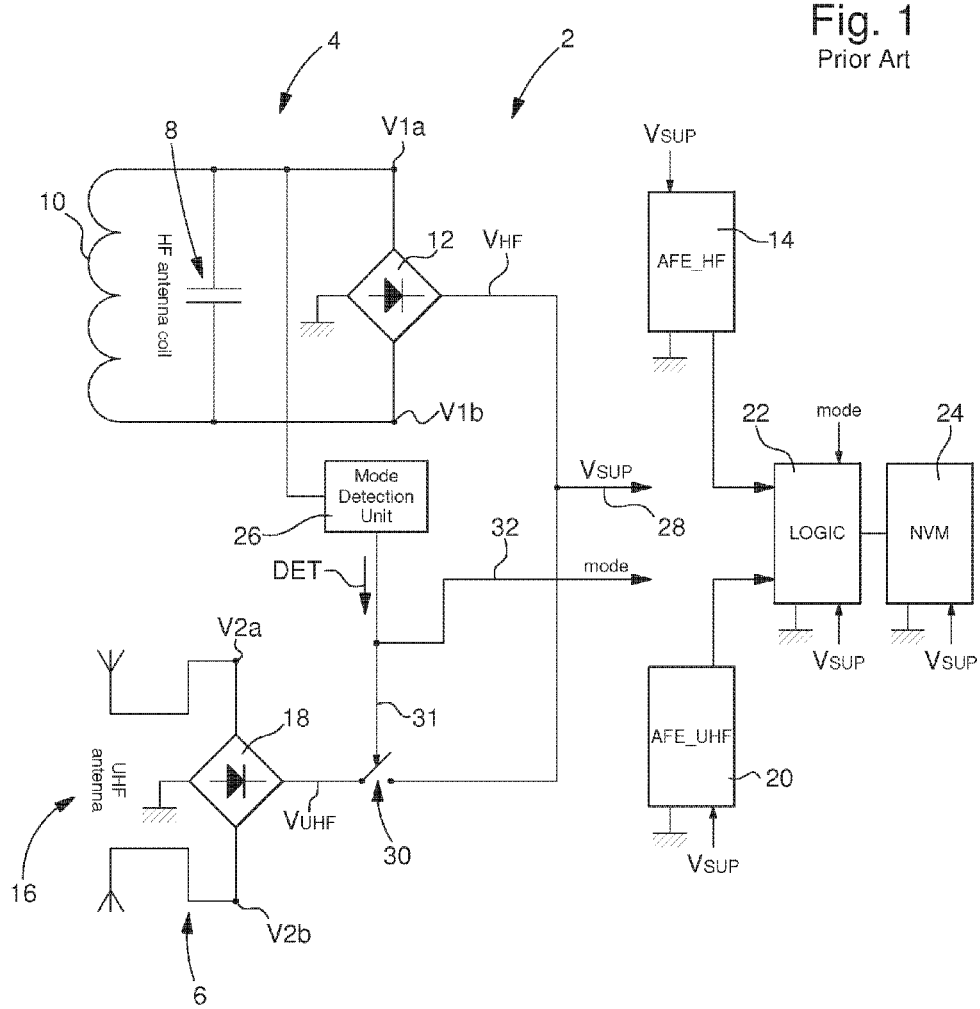
FIG. 1, already described, schematically shows a dual frequency identification device of the prior art.

A preferred embodiment of the invention will be described with the help of FIG. 2 which shows the power supply of a dual frequency HF-UHF identification device 42 comprising a RFID integrated circuit connected to a HF antenna coil 10 and to a UHF antenna 16. The power supply of the RFID circuit comprises a HF part 44 and a UHF part 48. The HF part comprises a HF rectifier 12 connected to a resonance circuit formed by the HF antenna 10 and the resonance capacitor 8, this resonance circuit providing alternatively positive and negative voltages to the input terminals V1a and V1b of the HF rectifier. The output of the HF rectifier is connected to a terminal of a smoothing capacitor 46 and provides at this terminal a first supply voltage $V_{HF}$. In a variant, the HF rectifier is associated to a voltage amplifying circuit for generating the first supply voltage. The UHF part 48 essentially comprises a UHF rectifier 18 formed by a charge pump linked to the two wires of the UHF antenna 16. This UHF rectifier receives at its two input terminals V2a and V2b positive and negative induced voltages and is arranged to provide at its output a second supply voltage $V_{UHF}$. According to the invention, the RFID integrated circuit further comprises a storage capacitor 50 which is common to the HF part 44 and to the UHF part 48 of the power supply of the identification device 42, the HF rectifier output and the UHF rectifier output being both continuously connected to the supply terminal of the common storage capacitor.

The supply terminal of said common storage capacitor 50 is connected, on the one hand, to the output of the HF rectifier 12 through a diode 52 arranged so as to block a current from said supply terminal to the HF rectifier output and, on the other hand, directly to the output of the UHF rectifier. Some advantages of such an electronic design have been given in the summary of the invention.

According to a particular variant of the invention, the supply terminal of the storage capacitor 50 is further connected to a shunt voltage regulator 56 able to absorb a shunt current $I_{Sh}$ so as to regulate the supply voltage $V_{SUP}$ on the supply line 28. Further, a resistor 54 for limiting the current from the HF rectifier is arranged between the output of the HF rectifier and said supply terminal.

Figure 2:
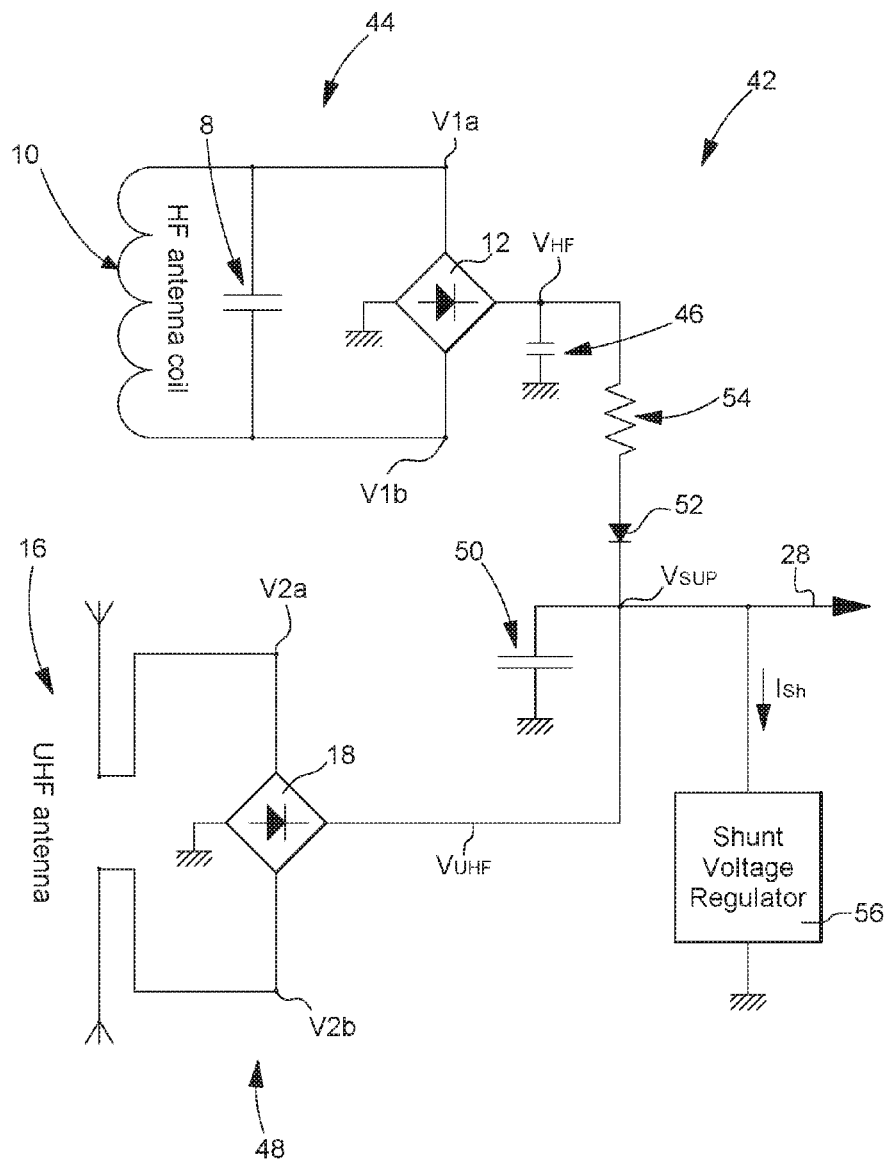
FIG. 2 shows the power supply of a passive dual frequency HF-UHF identification device according to the invention.

The power supply circuit shown on FIG. 2 can be implemented in diverse RFID integrated circuits and can be associated with other specific circuits arranged for controlling the power consumption of such circuits, in particular for minimizing their power consumption. In a case of a battery assisted HF-UHF identification device, the RFID integrated circuit can have a wake-up circuit associated with a listening mode. In a particular embodiment, the RFID integrated circuit comprises a HF field detector and/or a UHF field detector which are/is arranged for activating or controlling some parts of this RFID integrated circuit. Further means for regulating the supply voltage $V_{SUP}$ and/or protecting some parts of the RFID integrated circuit as well as specific boosting means (in particular a voltage amplifier for further increasing the supply voltage) can be provided by a person skilled in the art.

What is claimed is:

1. A dual frequency HF-UHF RFID integrated circuit comprising:
   a power supply having a HF part formed by a HF rectifier, the HF rectifier having two input terminals to be connected to two terminals of a resonance circuit formed by a HF antenna-coil and a resonance capacitor connected in parallel, the resonance circuit receiving HF fields and providing alternatively positive and negative voltages to the input terminals of the HF rectifier, and a UHF part comprising a UHF rectifier formed by a charge pump to be connected to a UHF antenna; and
   a storage capacitor common to the HF and UHF parts of the power supply, wherein
   the HF rectifier output and the UHF rectifier output are both continuously connected to the supply terminal of the common storage capacitor, and
   the supply terminal of the common storage capacitor is connected to the output of the HF rectifier through a diode arranged to block a current from the supply terminal to the HF rectifier output.

2. The dual frequency HF-UHF RFID integrated circuit according to claim 1, wherein
   the supply terminal of the common storage capacitor is directly connected to the output of the UHF rectifier.

3. A dual frequency HF-UHF identification device comprising:
   the dual frequency HF-UHF RFID integrated circuit according to claim 2;
   the resonance circuit formed by the HF antenna-coil and the resonance capacitor connected to the HF rectifier of the dual frequency HF-UHF RFID integrated circuit according to claim 2; and
   the UHF antenna connected to the UHF rectifier of the dual frequency HF-UHF RFID integrated circuit according to claim 2.

4. The dual frequency HF-UHF RFID integrated circuit according to claim 1, wherein
   a resistor for limiting a current provided by the HF rectifier is arranged between the output of the HF rectifier and the supply terminal.

5. A dual frequency HF-UHF identification device comprising:
   the dual frequency HF-UHF RFID integrated circuit according to claim 4;
   the resonance circuit formed by the HF antenna-coil and the resonance capacitor connected to the HF rectifier of the dual frequency HF-UHF RFID integrated circuit according to claim 4; and the UHF antenna connected to the UHF rectifier of the dual frequency HF-UHF RFID integrated circuit according to claim 4.

6. The dual frequency HF-UHF RFID integrated circuit according to claim 4, wherein
the supply terminal of the storage capacitor is further connected to a shunt voltage regulator.

7. A dual frequency HF-UHF identification device comprising:
the dual frequency HF-UHF RFID integrated circuit according to claim 6;
the resonance circuit formed by the HF antenna-coil and the resonance capacitor connected to the HF rectifier of the dual frequency HF-UHF RFID integrated circuit according to claim 6; and
the UHF antenna connected to the UHF rectifier of the dual frequency HF-UHF RFID integrated circuit according to claim 6.

8. A dual frequency HF-UHF identification device comprising:
the dual frequency HF-UHF RFID integrated circuit according to claim 1;
the resonance circuit formed by the HF antenna-coil and the resonance capacitor connected to the HF rectifier of the dual frequency HF-UHF RFID integrated circuit according to claim 1; and
the UHF antenna connected to the UHF rectifier of the dual frequency HF-UHF RFID integrated circuit according to claim 1.

* * * * *